Patented Oct. 14, 1941

2,258,673

UNITED STATES PATENT OFFICE 2,258,673

PROCESS FOR TREATING FAT-SOLUBLE VITAMIN-CONTAINING MATERIALS

Loran O. Buxton, Belleville, N. J., assignor to National Oil Products Company, Harrison, N. J., a corporation of New Jersey No Drawing. Application February 7, 1940, Serial No. 317,685

13 Claims. (Cl. 260—420)

This invention relates to the refining of fat-soluble vitamin-containing materials, more particularly to the removal of undesirable tastes and odors from fat-soluble vitamin-containing oils and concentrates.

As is well known, fish liver oils are an excellent source of both vitamins A and D; moreover, saponification of fish liver oils and extraction of the unsaponifiable material therefrom yields fat-soluble vitamin concentrates which have found a wide variety of uses. While such products are eminently satisfactory for many purposes, they generally possess the undesirable taste and odor normally associated with products of fish origin. Fat-soluble vitamin-containing materials derived from sources other than of a fish origin also may possess undesirable tastes and odors. Many attempts have been made in an endeavor to improve the taste and odor of fat-soluble vitamin-containing materials objectionable in these respects. For example, an alkali refining method has been employed for improving the tastes and odors of vitamin oils; in this method an alkali soap is prepared in the presence of the oil and then removed, the soap tending to carry with it some of the objectionable taste and odor. However, this method possesses many disadvantages, among them being that the oil becomes less stable when treated in this manner; furthermore, the odor and taste of the oil are not improved as much as might be desired. Another method commonly employed for improving the taste and odor of vitamin oils and concentrates involves passing steam through the heated oil or concentrate at a reduced pressure; while this method effects some deodorization, the deodorization is in most cases merely temporary, and, furthermore, this process removes only objectionable constituents of a volatile nature.

It is an object of this invention to provide substantially odorless and tasteless fat-soluble vitamin-containing materials.

It is another object of this invention to provide a process for improving the taste and odor of fat-soluble vitamin-containing materials having objectionable tastes and odors.

I have found that the undesirable tastes and odors of fat-soluble vitamin-containing materials objectionable in these respects may be substantially completely removed by contacting such fat-soluble vitamin-containing materials with an edible gum at temperatures between about 100° C. and about 200° C., preferably between about 150° C. and about 180° C. The fat-soluble vitamin-containing material may be treated in accordance with my invention by mixing the material with an edible gum and heating the mixture at temperatures between about 100° C. and about 200° C. in an open vessel; preferably, however, the material is mixed with the gum and the mixture heated to the desired temperature in the presence of an inert gas and under reduced pressure in order to minimize destruction of the vitamins and to assist the removal of the odoriferous substances. My invention may also be carried out by forming an aqueous slurry of the gum, mixing the slurry with the fat-soluble vitamin-containing material to be refined and heating the mixture to the desired temperature. The refining process of my invention may be combined with other refining processes for improving the character of fat-soluble vitamin-containing materials; thus, for example, these materials may be treated with a gum in accordance with my invention and the material then contacted with decolorizing carbon in order to obtain a light-colored product. When the refining treatment carried out in accordance with my invention is substantially complete, the fat-soluble vitamin-containing material may be separated from the gum in any suitable manner and processed as desired. It will be found that in every case the resulting products possess substantially no undesirable tastes or odors and hence are eminently suitable for practically all purposes, particularly for human consumption; moreover, the vitamin potencies of the materials refined are not substantially affected. Furthermore, I have found that the process of my invention greatly improves the stability of the fat-soluble vitamin-containing materials as is evidenced by the fact that the peroxide numbers of these materials are substantially lowered thereby.

Any fat-soluble vitamin-containing material having an undesirable taste and odor may be treated in accordance with my invention; thus materials containing vitamins A, D, E or K, such as, for example, cod liver oil, halibut liver oil, sword fish liver oil, tuna liver oil, shark liver oil, whale liver oil, porpoise liver oil, seal liver oil and similar oils may be treated, as well as fat-soluble vitamin concentrates obtained, for example, by saponification of a vitamin-containing oil and extraction of the unsaponifiable material. The process of my invention is particularly applicable to the refining of vitamin A or or D-containing oils or vitamin D concentrates of fish origin, since treatment of such materials in accordance with my invention produces products far superior to any of those now on the market. The vitamin-containing materials to be treated in accordance with my invention should not contain any foreign metals, since the presence of such metals usually accelerates deterioration of the vitamin content of the oil or concentrate at the elevated temperatures employed.

The gum employed in accordance with my invention may be any edible gum, such as, for example, gum tragacanth, gum arabic, gum guaiac, pectin, gum mastic and other edible gums well known to the art. Gum tragacanth or gum guaiac are preferably used in the practice of my invention since these gums are readily available, very inexpensive and give excellent results. While I prefer to use the edible gums as such, gum-like constituents extracted from the gums with solvents such as alcohol may also be employed, as well as the gum-like residues remaining from such extractions. Therefore, the term "gum" is used throughout the specification and claims in a broad sense so as to include not only the edible gums as such, but also gum-like constituents extracted from the gums with solvents and gum-like residues obtained from such extractions. It is advantageous to completely deaerate the gum before it is employed in the practice of my invention in order to minimize oxidation of the vitamins during the refining process; this deaeration may be carried out by forming an aqueous slurry of the gum and warming the slurry while bubbling an inert gas therethrough with thorough agitation until the slurry is completely deaerated. This deaerated slurry may then be employed directly in the practice of my invention. Other methods of deaeration may also be employed.

In carrying out the process of my invention, a fat-soluble vitamin-containing material having an objectionable taste and odor may be mixed with a suitable amount of an edible gum and the mixture then heated to a temperature between about 100° C. and about 200° C. The amount of gum admixed with the vitamin-containing material may vary widely depending to some extent upon the particular gum employed and to some extent upon the odor and taste of the vitamin-containing material to be refined; generally, however, an amount of gum between about 0.5% and about 10% of the weight of the vitamin-containing material is suitable. Antioxidants such as hydroquinone or lecithin may be added to the mixture if desired. The temperature at which the mixture is heated is particularly important since I have found that at temperatures below about 100° C. the undesirable taste and odor are not substantially completely removed from the fat-soluble vitamin-containing material. I prefer to heat the mixture to a temperature between about 150° C. and about 180° C. since at these temperatures optimum results are obtained. The temperature should preferably not exceed about 200° C., particularly if a vitamin-A-containing material is being treated, since deterioration of the vitamin is likely to commence at such temperatures.

The heating may be conducted in an open vessel if desired; however, in order to avoid the danger of deterioration of the vitamin A content of the materials treated in accordance with my invention, the heating step is preferably carried out in the presence of an inert gas such as nitrogen or carbon dioxide. Furthermore, I have found it desirable to heat the mixture at reduced pressures, preferably at pressures below about 20 mm., since under these conditions removal of the odoriferous constituents of the oil or concentrate is accelerated. The time of heating may vary to some extent; generally between about two minutes and about 1 hour, e. g. between about 5 minutes and about 20 minutes, are sufficient.

After the fat-soluble vitamin-containing material has been heated with the gum in accordance with my invention, the mass may be cooled and the vitamin material separated from the gum in any suitable manner. Thus, for example, if a fish liver oil is treated in accordance with my invention, the oil may be filtered or centrifuged from the gum. When recovering a fat-soluble vitamin concentrate treated in accordance with my invention, it has been found advisable in many cases to add a suitable amount of a solvent for the concentrate to the mixture of concentrate and gum and then to remove the gum from the vitamin solution. This method of operation has the advantage that very little, if any, of the vitamin-containing material is left on the gum. The vitamin-containing material may be recovered from the solution thereof in any of the many ways known to the art.

In some cases it may be found that the process of my invention, while it substantially improves the odor and taste of the fat-soluble vitamin-containing materials, also imparts thereto a color somewhat darker than that possessed by the original material. This color may be easily removed by contacting the refined vitamin-containing material with a decolorizing agent such as decolorizing carbon, whereupon a light-colored product substantially free from taste and odor may be obtained. If desired, the fat-soluble vitamin-containing materials may be decolorized by contact with decolorizing carbon prior to the refining process of my invention. The decolorizing treatments are preferably carried out by mixing the vitamin-containing material with a deaerated mixture of decolorizing carbon and a solvent for the material and agitating the mass in the absence of air; this process is described and claimed in my copending application Serial No. 227,599, filed August 30, 1938.

The refined products of my invention possess very little, if any, of the objectionable tastes and odors characteristic of the materials from which they are obtained; hence these products are eminently suitable for a variety of purposes and find particular application in the preparation of vitamin products for human consumption. Furthermore, extensive tests have indicated that the products of my invention have substantially lower peroxide numbers than those of the original vitamin-containing materials; this factor is of great importance since vitamin-containing materials having low peroxide numbers are much more stable than those having high peroxide numbers. Thus it will be evident that my invention not only improves the taste and odor of the fat-soluble vitamin-containing materials, but also improves their stability.

My invention is also applicable to the refining of any fatty substance having an undesirable taste and odor; thus, for example, lard or vegetable oils which have become rancid due to prolonged standing under atmospheric conditions may be subjected to the refining process of my invention so as to remove the objectionable rancid taste and odor.

My observations have indicated that vapors liberated from the gum upon heating to the elevated temperatures employed in accordance with my invention are somewhat responsible for the refining action of these gums upon the fat-soluble vitamin-containing materials; these vapors are believed to result from partial decomposition of the gum. However, the presence of the solid gum in the vitamin-containing material also exerts considerable refining action upon the fat-soluble vitamin-containing materials. Hence I do not wish to be confined to any particular theory as to the manner in which my invention operates.

The following examples are illustrative of my invention; amounts are given in parts by weight:

Example I 100 parts of cod liver oil having a very fishy taste and odor and containing 1870 A units per gram were mixed with 2 parts of gum tragacanth and 2 parts of gum guaiac; this mixture was then heated at 180° C. for 5 minutes in a nitrogen atmosphere and under 15 mm. pressure. At the end of this time the oil was permitted to cool and the residual gum was removed by filtration. The resulting product was substantially odorless and tasteless and had practically the same vitamin A content as the original oil. The peroxide number of the refined oil was 0, whereas the peroxide number of the original oil was 7.

Example II 250 parts of halibut liver oil containing 81,000 A units per gram were mixed with 2.5 parts of gum guaiac; the mixture was then heated at 150° C. for 20 minutes in a carbon dioxide atmosphere and under 10 mm. pressure. At the end of this time the mass was permitted to cool and the residual gum was removed by filtration. The resulting product was substantially odorless and tasteless and had practically the same vitamin A content as the original oil. The peroxide number of the refined oil was substantially 0, whereas the peroxide number of the original oil was 8.

Example III 100 parts of cod liver oil having a very fishy taste and odor and containing 1830 A units per gram were mixed with 5 parts of gum tragacanth; this mixture was then heated for 5 minutes at 170° C. in an atmosphere of carbon dioxide and under 10 mm. pressure. At the end of this time the oil was permitted to cool and the residual gum was removed by filtration. The resulting product was substantially odorless and tasteless and possessed practically the same vitamin A content as the original oil.

Example IV 250 parts of halibut liver oil having a very fishy taste and odor and containing 81,000 A units per gram were mixed with 5 parts of gum guaiac and 2.5 parts of soybean lecithin; this mixture was then heated at 150° C. for 10 minutes in a nitrogen atmosphere and under 10 mm. pressure. At the end of this time the oil was permitted to cool and the solid material was removed by filtration. The resulting product was substantially odorless and tasteless and had practically the same vitamin A content as the original oil.

Example V 250 parts of shark liver oil having a very fishy taste and odor and containing 109,500 A units per gram were mixed with 5 parts of gum tragacanth; the mixture was then heated at 180° C. for 15 minutes in a carbon dioxide atmosphere and under 15 mm. pressure. At the end of this time the oil was permitted to cool and the residual gum was removed by filtration. The resulting product was substantially odorless and tasteless and had practically the same vitamin A content as the original oil.

Example VI 250 parts of shark liver oil having a very fishy taste and odor and containing 109,500 A units per gram were mixed with 5 parts of gum mastic; the mixture was then heated at 180° C. for 15 minutes in a carbon dioxide atmosphere and under 15 mm. pressure. At the end of this time the oil was permitted to cool and the residual gum was removed by filtration. The resulting product was substantially odorless and tasteless and had practically the same vitamin A content as the original oil.

Example VII 250 parts of shark liver oil having a very fishy taste and odor and containing 109,500 A units per gram were mixed with 5 parts of citrus pectin; the mixture was then heated at 180° C. for 15 minutes in a carbon dioxide atmosphere and under 15 mm. pressure. At the end of this time the oil was permitted to cool and the residual gum was removed by filtration. The resulting product was substantially odorless and tasteless and had practically the same vitamin A content as the original oil.

Example VIII 10 parts of a decolorizing carbon known as "Nuchar XXX" were suspended in 900 parts of ethylene dichloride and the suspension agitated for 10 minutes until thoroughly deaerated. 100 parts of shark liver oil having a very fishy taste and odor and a dark color, and containing 109,500 A units per gram were then added to the suspension and the mixture agitated for 30 minutes. The carbon was then removed by filtration and washed with ethylene dichloride in a nitrogen atmosphere to remove the adsorbed vitamin-containing material. The ethylene dichloride used to wash the carbon was combined with the solution of shark liver oil in ethylene dichloride and the ethylene dichloride was then evaporated from this mixture in a nitrogen atmosphere and under a vacuum. The decolorized oil was then mixed with 2 parts of gum arabic and the mixture heated at 150° C. for 10 minutes in a nitrogen atmosphere and under 10 mm. pressure. At the end of this time the oil was permitted to cool and the residual gum was removed by filtration. The resulting product was substantially odorless and tasteless and had practically the same vitamin A content as the original oil; moreover, this product possessed a light-yellow color.

It will be evident from the above description that my invention provides a new and effective method of preparing substantially odorless and tasteless fat-soluble vitamin-containing materials from fat-soluble vitamin-containing materials having objectionable tastes and odors. My invention will, therefore, be of great interest to those engaged in the preparation of vitamin compositions, particularly for human and animal consumption.

It is to be understood that the vitamin contents of the various oils and concentrates mentioned in the specification are given in international vitamin units.

Since certain changes in carrying out the above process and certain modifications in the compositions which embody the invention may be made without departing from its scope, it is intended that all matter contained in the above description shall be interpreted as illustrative and not in a limiting sense.

Having described my invention, what I claim as new and desire to secure by Letters Patent, is:

1. A process for the preparation of substantially odorless and tasteless oils and fats from oils and fats having objectionable tastes and odors, which comprises contacting a substance selected from the group consisting of oils and fats having objectionable tastes and odors with an edible gum at a temperature between about 100° C. and about 200° C.

2. A process for the preparation of substantially odorless and tasteless oils and fats from oils and fats having objectionable tastes and odors, which comprises contacting a substance selected from the group consisting of oils and fats having objectionable tastes and odors with an edible gum at a temperature between about 150° C. and about 180° C.

3. A process for refining fish liver oils which comprises mixing a fish liver oil with an edible gum and an antioxidant, heating the mixture at a temperature between about 150° C. and about 180° C. in an inert gas atmosphere and under reduced pressure, permitting the mass to cool and separating the oil from the residual solid material.

4. A process for refining fish liver oil which comprises admixing a fish liver oil with a completely deaerated mixture of a decolorizing carbon and a solvent in the oil, agitating the mass, separating the carbon from the oil, and contacting the decolorized oil with an edible gum at a temperature between about 150° C. and about 180° C. in an inert gas atmosphere and under a reduced pressure.

5. A process of removing objectionable odors and tastes from fat-soluble vitamin-containing materials, which comprises heating a fat-soluble vitamin-containing material selected from the class consisting of fish oils, fish liver oils and concentrates thereof with an edible gum at a temperature between about 100° C. and about 200° C.

6. A process of removing objectionable odors and tastes from fat-soluble vitamin-containing materials, which comprises heating a fat-soluble vitamin-containing material selected from the class consisting of fish oils, fish liver oils and concentrates thereof with an edible gum at a temperature between about 150° C. and about 180° C.

7. A process of removing objectionable odors and tastes from fat-soluble vitamin-containing materials, which comprises heating a fat-soluble vitamin-containing material selected from the class consisting of fish oils, fish liver oils and concentrates thereof with an edible gum at a temperature between about 100° C. and about 200° C., said heating being carried out in an inert atmosphere.

8. A process of removing objectionable odors and tastes from fat-soluble vitamin-containing materials, which comprises heating a fat-soluble vitamin-containing material selected from the class consisting of fish oils, fish liver oils and concentrates thereof with an edible gum at a temperature between about 150° C. and about 180° C., said heating being carried out in an inert atmosphere.

9. A process of removing objectionable odors and tastes from fat-soluble vitamin-containing materials, which comprises heating a fat-soluble vitamin-containing material selected from the class consisting of fish oils, fish liver oils and concentrates thereof with an edible gum at a temperature between about 100° C. and about 200° C., said heating being carried out under a reduced pressure.

10. A process of removing objectionable odors and tastes from fat-soluble vitamin-containing materials, which comprises heating a fat-soluble vitamin-containing material selected from the class consisting of fish oils, fish liver oils and concentrates thereof with an edible gum at a temperature between about 150° C. and about 180° C., said heating being carried out under an inert atmosphere and under reduced pressure.

11. A process of removing objectionable odors and tastes from fat-soluble vitamin-containing materials, which comprises heating a fat-soluble vitamin-containing material selected from the class consisting of fish oils, fish liver oils and concentrates thereof with gum tragacanth at a temperature between about 150° C. and about 180° C., said heating being carried out under an inert atmosphere and under reduced pressure.

12. A process of removing objectionable odors and tastes from fat-soluble vitamin-containing materials, which comprises heating a fat-soluble vitamin-containing material selected from the class consisting of fish oils, fish liver oils and concentrates thereof with gum guaiac at a temperature between about 150° C. and about 180° C., said heating being carried out under an inert atmosphere and under reduced pressure.

13. A process of removing objectionable odors and tastes from fat-soluble vitamin-containing materials, which comprises heating a fat-soluble vitamin-containing material selected from the class consisting of fish oils, fish liver oils and concentrates thereof with gum arabic at a temperature between about 150° C. and about 180° C., said heating being carried out under an inert atmosphere and under reduced pressure.

LORAN O. BUXTON.